US012586411B2

(12) United States Patent (10) Patent No.: US 12,586,411 B2
Uemura (45) Date of Patent: Mar. 24, 2026

(54) TARGET IDENTIFICATION DEVICE, ELECTRONIC DEVICE, TARGET IDENTIFICATION METHOD, AND STORAGE MEDIUM

(71) Applicant: CANON KABUSHIKI KAISHA, Tokyo (JP)

(72) Inventor: Shimon Uemura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 344 days.

(21) Appl. No.: 18/187,749

(22) Filed: Mar. 22, 2023

(65) Prior Publication Data

US 2023/0334910 A1 Oct. 19, 2023

(30) Foreign Application Priority Data

Apr. 18, 2022 (JP) ................................. 2022-068161

(51) Int. Cl.
*G06V 40/18* (2022.01)
*G06V 40/60* (2022.01)

(52) U.S. Cl.
CPC .......... *G06V 40/197* (2022.01); *G06V 40/193* (2022.01); *G06V 40/67* (2022.01)

(58) Field of Classification Search
None
See application file for complete search history.

(56) References Cited

U.S. PATENT DOCUMENTS

| | | | | |
|---|---|---|---|---|
| 5,291,560 A | * | 3/1994 | Daugman | G06F 21/32 382/222 |
| 5,327,191 A | * | 7/1994 | Shindo | G06V 40/19 396/89 |
| 5,557,364 A | * | 9/1996 | Shindo | H04N 23/611 396/51 |
| 2002/0057908 A1 | * | 5/2002 | Otani | G03B 13/02 396/51 |
| 2013/0135196 A1 | * | 5/2013 | Park | G06F 3/013 348/78 |
| 2013/0278631 A1 | * | 10/2013 | Border | G06F 3/04842 345/633 |

(Continued)

FOREIGN PATENT DOCUMENTS

| | | |
|---|---|---|
| JP | 08-504979 A | 5/1996 |
| JP | 2004272706 A | 9/2004 |

(Continued)

*Primary Examiner* — Soo Shin
(74) *Attorney, Agent, or Firm* — Cowan, Liebowitz & Latman, P.C.

(57) ABSTRACT

In order to provide a target identification device capable of performing recognition in a short period of time with high recognition accuracy, the target identification device includes: a display element; an imaging element that has an optical axis direction with deviation from an optical axis direction of the display element and captures an image of an eyeball of a user; a guide unit that performs guiding such that a sight direction of the user is directed to the optical axis direction of the imaging element; and an identification unit that identifies the eyeball on the basis of a feature amount calculated from the image of the eyeball in a state in which the guide unit has guided the sight direction to being directed in the optical axis direction of the imaging element.

9 Claims, 10 Drawing Sheets

(56) References Cited

U.S. PATENT DOCUMENTS

| | | | | |
|---|---|---|---|---|
| 2013/0342672 A1* | 12/2013 | Gray | ..................... | H04W 12/06 |
| | | | | 348/78 |
| 2015/0253930 A1* | 9/2015 | Kozloski | ............ | H04N 21/4312 |
| | | | | 345/175 |
| 2017/0070680 A1* | 3/2017 | Kobayashi | ............. | H04N 23/63 |
| 2017/0161526 A1* | 6/2017 | Kim | ......................... | G06F 3/013 |
| 2019/0113760 A1* | 4/2019 | Tatsuta | ............... | G02B 27/0176 |
| 2021/0112226 A1* | 4/2021 | Abou | ................... | G02B 27/017 |
| 2021/0302804 A1* | 9/2021 | Sato | ..................... | H04N 23/695 |
| 2023/0224561 A1* | 7/2023 | Ito | ......................... | H04N 23/45 |
| | | | | 348/262 |

FOREIGN PATENT DOCUMENTS

| | | | |
|---|---|---|---|
| JP | 2008299045 | A | 12/2008 |
| JP | 2015075877 | A | 4/2015 |
| JP | 2017091129 | A | 5/2017 |
| JP | 2018-194921 | A | 12/2018 |
| WO | 2007099834 | A | 9/2007 |
| WO | 2020194892 | A | 10/2020 |
| WO | 2021221098 | A | 11/2021 |

* cited by examiner

FIG. 1
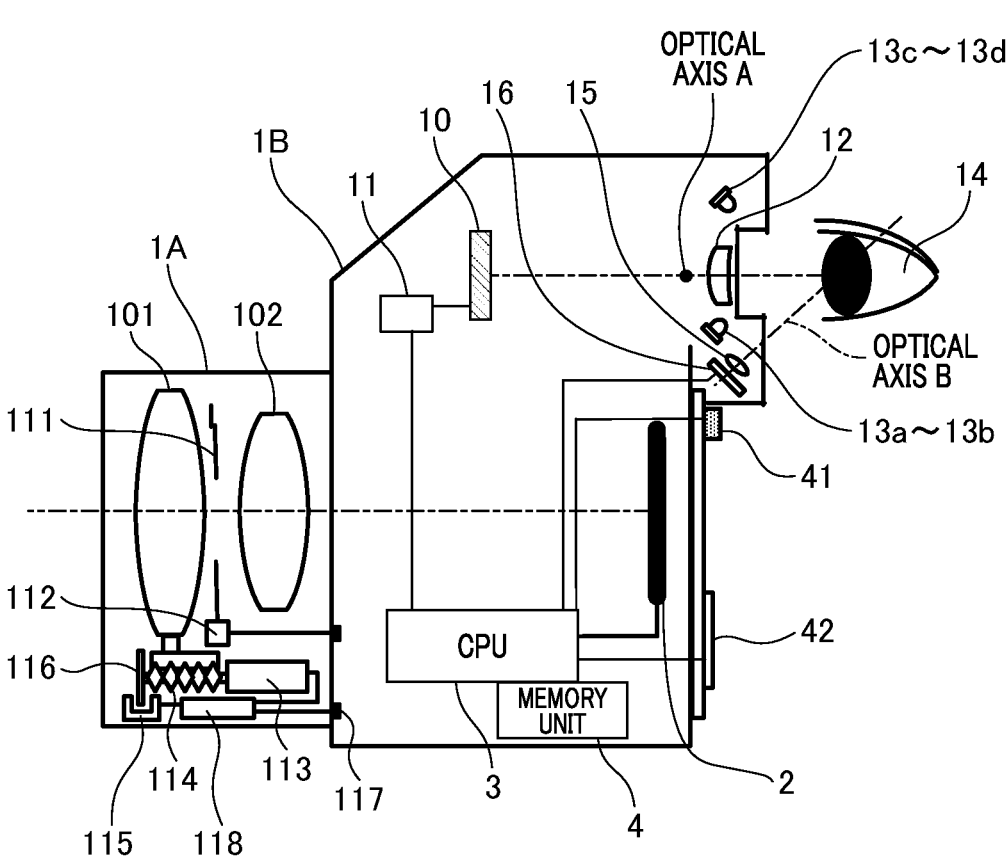
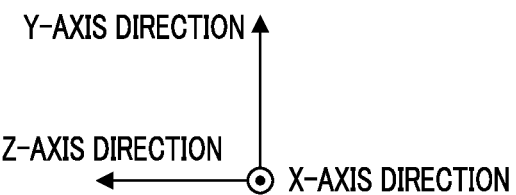
Y-AXIS DIRECTION
Z-AXIS DIRECTION
X-AXIS DIRECTION

FIG. 5

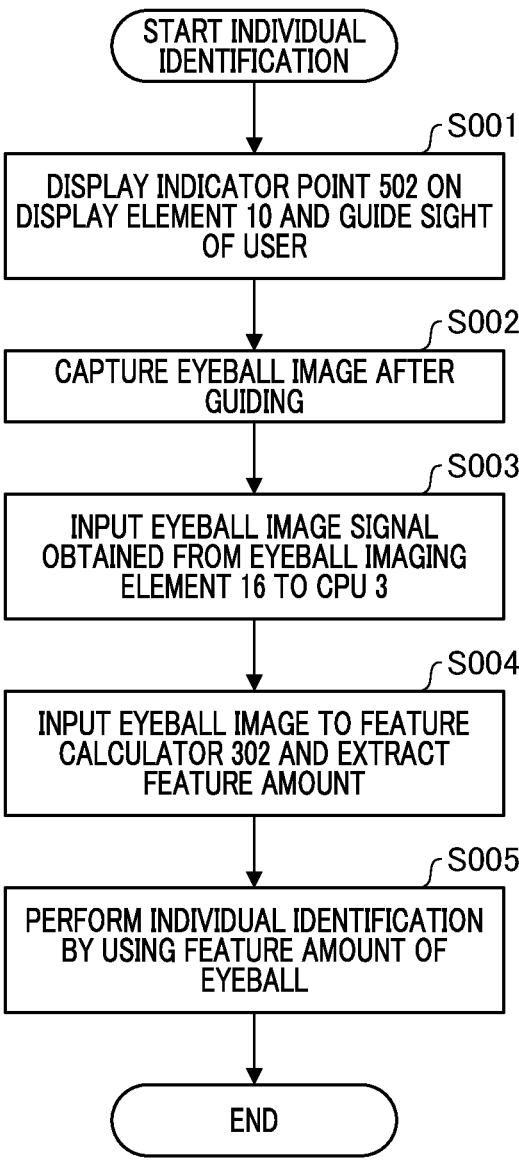

START INDIVIDUAL
IDENTIFICATION

S001

DISPLAY INDICATOR POINT 502 ON
DISPLAY ELEMENT 10 AND GUIDE SIGHT
OF USER

S002

CAPTURE EYEBALL IMAGE AFTER
GUIDING

S003

INPUT EYEBALL IMAGE SIGNAL
OBTAINED FROM EYEBALL IMAGING
ELEMENT 16 TO CPU 3

S004

INPUT EYEBALL IMAGE TO FEATURE
CALCULATOR 302 AND EXTRACT
FEATURE AMOUNT

S005

PERFORM INDIVIDUAL IDENTIFICATION
BY USING FEATURE AMOUNT OF
EYEBALL

END

FIG. 7

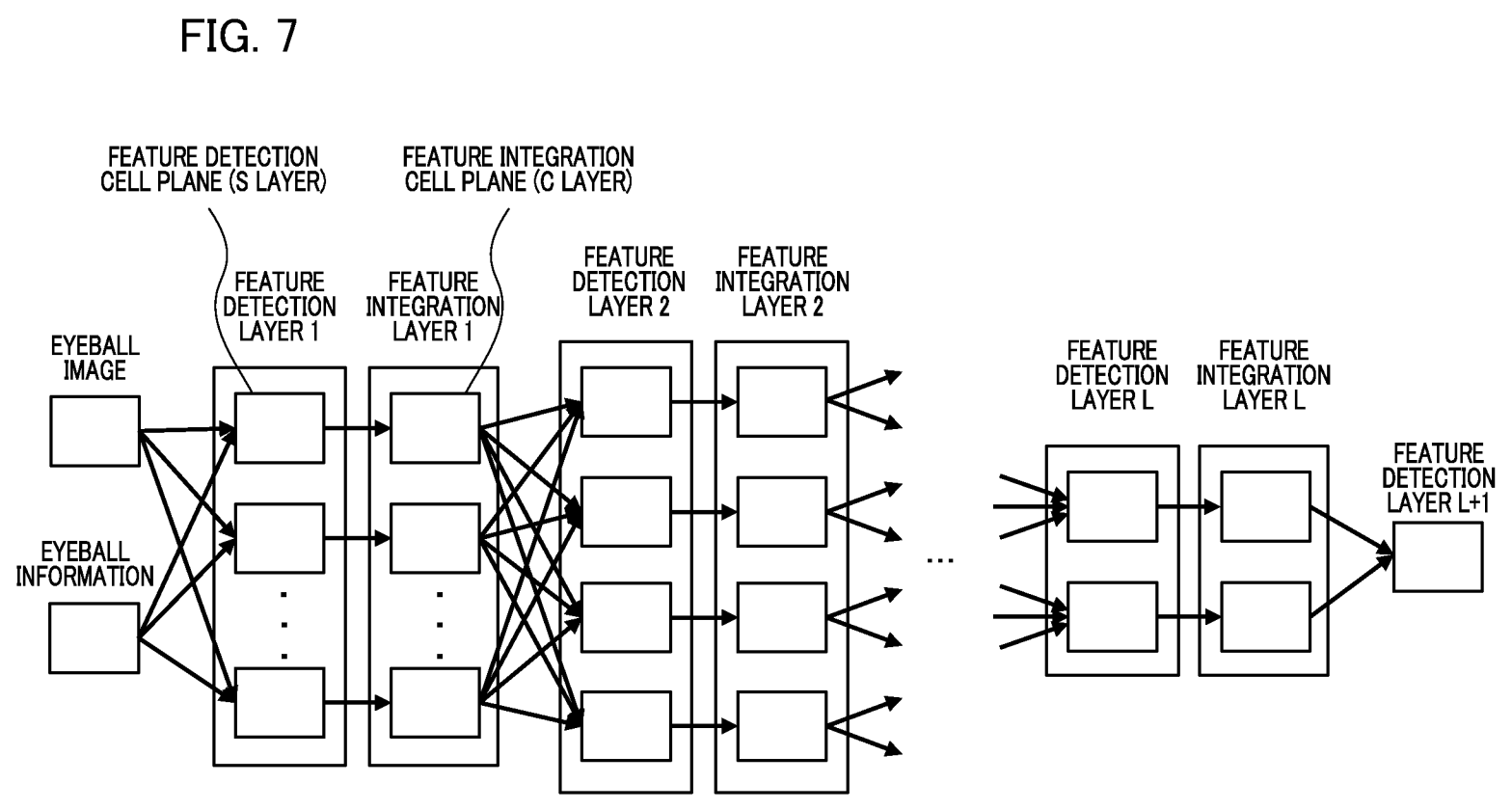

FEATURE DETECTION
CELL PLANE (S LAYER)

FEATURE INTEGRATION
CELL PLANE (C LAYER)

EYEBALL
IMAGE

EYEBALL
INFORMATION

FEATURE
DETECTION
LAYER 1

FEATURE
INTEGRATION
LAYER 1

FEATURE
DETECTION
LAYER 2

FEATURE
INTEGRATION
LAYER 2

FEATURE
DETECTION
LAYER L

FEATURE
INTEGRATION
LAYER L

FEATURE
DETECTION
LAYER L+1

FIG. 8

TARGET IDENTIFICATION DEVICE, ELECTRONIC DEVICE, TARGET IDENTIFICATION METHOD, AND STORAGE MEDIUM

BACKGROUND OF THE INVENTION

Field of the Invention

The present invention relates to a target identification device, an electronic device, a target identification method, a storage medium, and the like.

Description of the Related Art

In recent years, methods for authenticating and identifying individuals on the basis of face images or the like of persons captured by cameras have been applied. As one of the methods, there is a technology using iris authentication. According to Japanese Translation of PCT International Application Publication No. H8-504979, for example, individuals are authenticated and identified by extracting iris parts from eyeball images of persons, comparing iris codes with reference codes, and thereby determining identities.

Also, according to Japanese Patent Laid-Open No. 2018-194921, a scheme of displaying images of part of the face of users and a recommended orientation of devices for the users is used to make the targets face a plurality of directions, and imaging is performed, in order to improve authentication accuracy.

However, according to Japanese Translation of PCT International Application Publication No. H8-504979, an element that images eyeballs as will be described later is disposed with deviation from an optical axis of a display element. Therefore, there is a problem that identification accuracy is degraded in a case where users are looking in a specific direction in a configuration in which the eyeballs of the users who are gazing at the display element are imaged in an oblique direction rather than from the front. In terms of convenience when the camera is used, the configuration is required to be unlikely to degrade individual identification accuracy even if individual identification is performed in a situation in which there may be variations in eyeball directions.

Also, according to Japanese Patent Laid-Open No. 2018-194921, it is necessary for the users to attempt correction of the device direction several times until their faces are properly directed while the users view their face images and directions to which the direction of the device is to be corrected through the display on the device, and there is a problem that it takes time to perform identification.

The present invention was made in view of the above problem, and one object thereof is to provide a target identification device capable of performing recognition in a short period of time with high recognition accuracy.

SUMMARY OF THE INVENTION

A target identification device according to an aspect of the present invention includes: a display element; an imaging element that has an optical axis direction with deviation from an optical axis direction of the display element and captures an image of an eyeball of a user; and at least one processor or circuit configured to function as a guide unit configured to perform guiding such that a sight direction of the user is directed to the optical axis direction of the imaging element and an identification unit configured to identify the eyeball on the basis of a feature amount calculated from the image of the eyeball in a state in which the guide unit has guided the sight direction to being directed in the optical axis direction of the imaging element.

Further features of the present invention will become apparent from the following description of embodiments with reference to the attached drawings.

BRIEF DESCRIPTION OF THE DRAWINGS

FIG. 1 is an explanatory diagram illustrating an overview of a configuration of a camera 1 according to an embodiment.

FIG. 5 is a flowchart illustrating an overview of individual identification processing performed by a target identification device according to the embodiment.

FIG. 7 is a diagram for explaining a configuration example of a feature calculator 302 that performs individual identification from two-dimensional image data according to the embodiment.

FIG. 8 is a diagram for explaining details of feature detection processing in a feature detection cell plane and feature integration processing in a feature integration cell plane.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Also, an example in which a target identification device is an electronic device with a camera mounted thereon will be described in an embodiment. However, the electronic device includes a smartphone, a tablet computer, an electronic device inside a mobile body such as an automobile, or an electronic device such as a device for opening/closing a door or a gate. Also, the target identification device may be mounted on the electronic device or may be mounted on a terminal for remotely operating the electronic device.

Figure 2A:
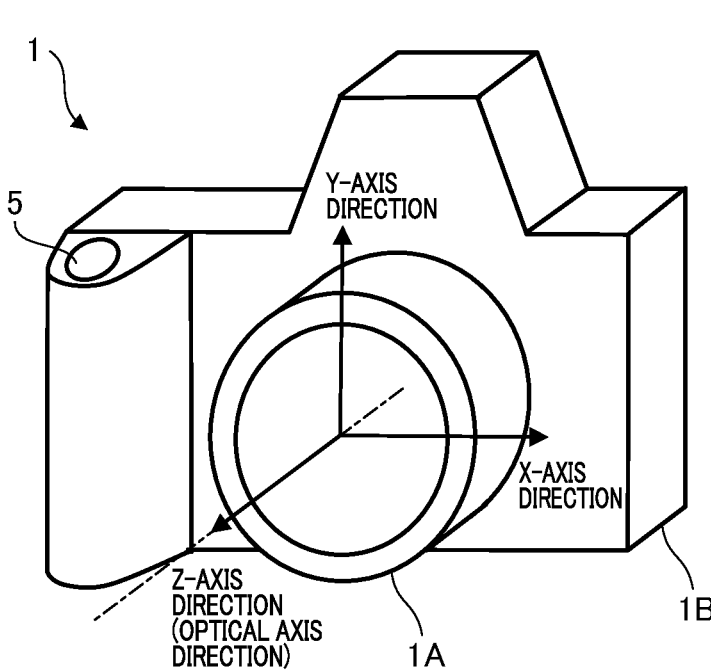
FIG. 2A is a front perspective view of the camera 1 according to the embodiment.
Figure 2B:
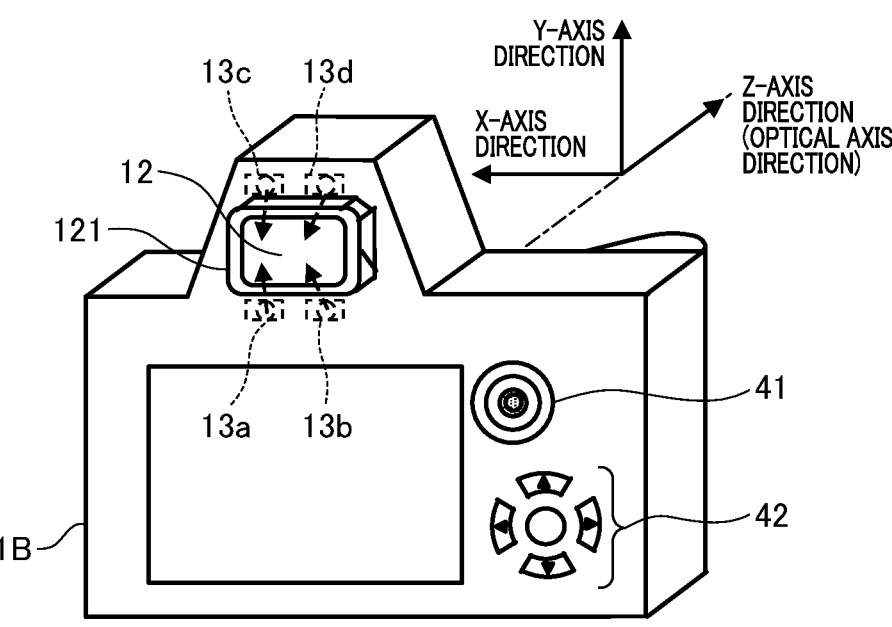
FIG. 2B is a rear perspective view of the camera 1.

FIG. 1 is an explanatory diagram illustrating an overview of a configuration of a camera 1 according to the embodiment and illustrates a section of a camera casing cut along a YZ plane. FIG. 2A is a front perspective view of the camera 1 according to the embodiment, and FIG. 2B is a rear perspective view of the camera 1. Hereinafter, an overview of the camera will be described by using FIGS. 1 and 2.

The camera 1 according to the present embodiment is configured of an imaging lens 1A and a casing unit 1B of a camera main body. Although the inside of the imaging lens 1A is represented by two lenses 101 and 102 in the present embodiment for convenience, the inside is configured of more lenses in practice.

The reference sign 2 denotes an imaging element such as a CMOS image sensor for imaging an object via the imaging lens, and the imaging element is disposed in a planned image formation plane of the imaging lens 1A of the camera 1. The camera 1 is provided with a CPU 3 that controls the entire camera and a memory unit 4 that records an image captured by the imaging element 2.

Also, a display element 10 configured of a liquid crystal display or the like for displaying the captured image, a display element drive circuit 11 for driving the display element 10, and an eyepiece lens 12 for observing an object image displayed on the display element 10. Also, an eyepiece window frame 121 for a user to look into the display element 10 included inside the camera is disposed on the rear surface of the camera 1 as illustrated in FIG. 2B.

The reference signs 13a to 13d are light sources for illuminating an eyeball 14 of a person who captures an image, and the light sources include infrared light emitting diodes and are disposed around the eyepiece lens 12. An eyeball imaging element 16 is an imaging element for imaging the eyeball 14, and an optical axis direction of the eyeball imaging element 16 deviates from an optical axis direction of the display element 10 as in FIG. 1.

Note that although the target identification device according to the present embodiment is configured to recognize an eyeball as a target, the target is not limited to an eyeball. It may be a part of a human body such as a face, a palm, or a fingertip, for example. Alternatively, it may be a barcode or the like.

A reflected image obtained by corneal reflection of the eyeball illuminated by the light sources 13a to 13d and a pupil image are formed on the eyeball imaging element 16 by a light receiving lens 15, and a sight direction is detected on the basis of a positional relationship between the reflected image and the pupil image. The light receiving lens 15 positions the pupil of the eyeball 14 of the person who captures the image and the eyeball imaging element 16 in a conjugated image forming relationship.

The reference sign 5 is a release button that is an operation member for receiving an imaging operation from the user, and 41 and 42 denote various switches provided on the rear surface of the camera 1. The reference sign 111 is a diaphragm, and 112 denotes a diaphragm drive unit. Also, 113 denotes a lens drive motor, and 114 denotes a lens driving member which is for adjusting a focal point by causing the position of the lens 101 to move in the optical axis direction.

The reference sign 115 denotes a photocoupler, 116 is a pulse panel, and these parts 115 and 116 are used to detect an initial position of the lens 101. The reference sign 117 is a mount contact point for establishing electrical connection between the imaging lens 1A and the casing unit 1B of the camera main body, and 118 denotes a lens focal point adjustment circuit.

Figure 3:
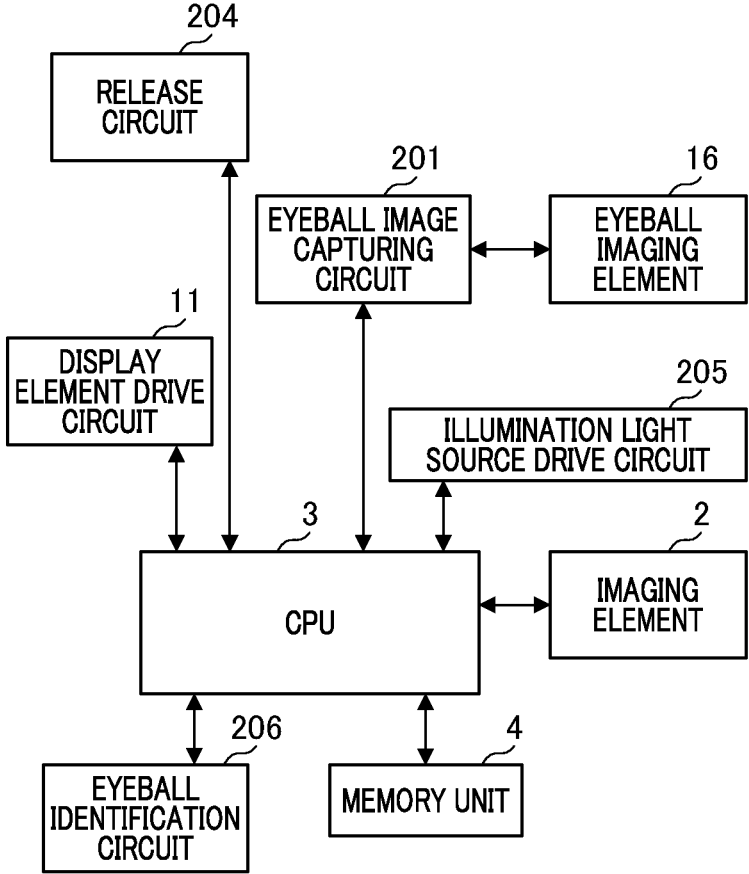
FIG. 3 is a functional block diagram illustrating an electrical configuration example of a target identification device according to the embodiment.

FIG. 3 is a functional block diagram illustrating an electrical configuration example of the target identification device according to the embodiment, in which the same reference signs are applied to the same components as those in FIG. 1. Note that some of functional blocks illustrated in FIG. 3 are realized by causing the CPU 3 as a computer included in the target identification device to execute a computer program stored in the memory unit 4 serving as a storage medium.

However, some or all of the functions may be realized by hardware. As the hardware, it is possible to use an application-specific integrated circuit (ASIC), a processor (reconfigurable processor, a DSP), or the like.

Also, each functional block illustrated in FIG. 3 may not be incorporated in the same casing and may be configured of separate devices connected to each other via a signal path.

Note that the above description related to FIG. 3 similarly applies to FIGS. 6 to 8, which will be described later.

An eyeball image capturing circuit 201 for processing an image captured by the eyeball imaging element 16 and a display element drive circuit 11 for controlling display on the display element 10 are connected to the CPU 3 incorporated in the camera main body. Also, an illumination light source drive circuit 205 for driving the light sources 13a to 13d and an eyeball identification circuit 206 for identifying a user of the camera on the basis of the eyeball image acquired from the eyeball image capturing circuit are connected to the CPU 3.

The memory unit 4 accompanying the CPU 3 stores imaging signals from the imaging element 2 and the eyeball imaging element 16, sight correction data for correcting differences in sights of individuals, which will be described later, a computer program executed by the CPU 3, and the like.

The eyeball image capturing circuit 201 detects the eyeball image on the basis of the image from the eyeball imaging element 16 and transmits the eyeball image information to the CPU 3. The CPU 3 extracts each feature point of the eyeball image necessary to detect sight in accordance with a predetermined algorithm, which will be described later, and further calculates a sight direction of the person who captures the image from the position of each feature point.

Figure 4:
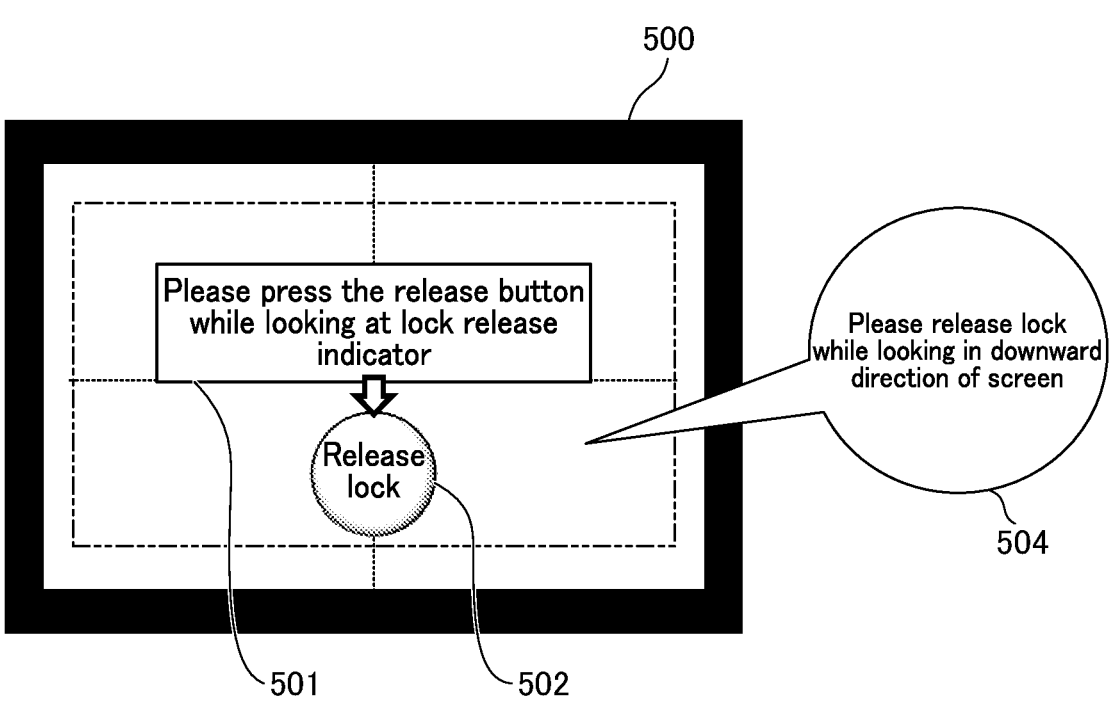
FIG. 4 is a diagram illustrating inside a field of view of a viewfinder according to the embodiment.

The display element drive circuit 11 superimposes guidance display 501, an indicator point 502, and the like as illustrated in FIG. 4, for example, on the image and displays the image in a viewfinder field-of-view screen 500.

A switch SW1 that turns on by a first stroke of a release button 5 and starts light measurement of the camera, distance measurement, a sight detecting operation, and the like and a switch SW2 that turns on by a second stroke of the release button and starts an imaging operation are connected to the release circuit 204. Also, signals from SW1 and SW2 are transmitted from the release circuit 204 to the CPU 3.

The eyeball identification circuit 206 performs similarity calculation on the eyeball image generated by the eyeball image capturing circuit 201 and transmits a result of determining who the user is to the CPU 3.

FIG. 4 is a diagram illustrating a field-of-view of the viewfinder according to the embodiment and illustrates a state in which the display element 10 is operating. Individual identification in the present embodiment is performed in a state where the user is looking into the viewfinder and is visually recognizing display inside the field-of-view of the viewfinder in FIG. 4.

In FIG. 4, 500 denotes the viewfinder field-of-view screen. In the example in FIG. 4, it is assumed that a lock screen of restricting utilization of the camera is displayed immediately after the user looks into the viewfinder, and if individual identification is performed from this state and the user is recognized as a registered user as a result, then the locking is released, and utilization of the camera is enabled. Details of the aforementioned personal authentication operation (lock release operation) based on individual identification will be described by using the flow in FIG. 5.

FIG. 5 is a flowchart illustrating an overview of individual identification processing performed by the object identification device according to the present embodiment. Note that the operation in each step in the flowchart in FIG. 5 is performed by the CPU 3 serving as a control computer executing the computer program stored in the memory unit 4.

The flow of the individual identification operation is started in the state where the user is looking into the viewfinder and is visually recognizing the viewfinder field-of-view screen 500 as described above.

First, the CPU 3 displays the indicator point 502 illustrated in FIG. 4 on the display element 10 in Step S001 to guide the sight of the user who is looking into the viewfinder on the lower side of the viewfinder field-of-view screen 500. Step S001 functions as a guide step (guide unit) of guiding the sight direction of the eyeball to the optical axis direction of the imaging element.

At that time, the indicator point 502 is displayed on the lower side of the viewfinder field-of-view screen 500 and guidance display 501 for providing an instruction to press a button to release lock is performed on the screen display in FIG. 4. In other words, the sight direction is guided to a predetermined direction and an instruction to operate a predetermined operation unit (for example, pressing a lock release button) is given by displaying an indicator at a predetermined position on the display element.

Also, once the button to release the lock (for example, a release button) is pressed, the CPU 3 identifies the eyeball, and in a case where the eyeball is determined to be the same as an eyeball registered in advance, the CPU 3 enables a main power of the camera to be turned on. At this time, the CPU 3 functions as a release unit of releasing a predetermined function of the camera as a predetermined electronic device, for example, power-on locking.

Note that although the example of the camera has been described as the electronic device in the present embodiment, the electronic device may be a terminal such as a smartphone or a tablet, for example, or may be an electronic device for releasing lock of a door or a gate as described above.

As the guidance display 501, "Press the release button while looking at the lock release indicator", for example, is displayed as illustrated in FIG. 4. Note that although the button to be pressed to release lock is assumed to be the release button 5 here, another button may be assigned thereto. Also, the above guidance display 501 is an example, and another guidance may be displayed.

Also, audio guide 504 may be provided in addition to the guidance display 501. The audio guide 504 may be audio guide 504 such as "Please release the lock while looking at the lower side of the screen" as illustrated in FIG. 4, for example. In other words, the sight direction of the eyeball may be guided to a predetermined direction by the audio instruction.

In this manner, it is only necessary to guide the user to perform an operation to release lock by using at least one of the guidance display 501 and the audio guide 504.

As described above, the user is guided to look at the indicator point 502 provided on the lower side of the screen when individual identification is performed in the present embodiment, and it is thus possible to improve sight detection accuracy when the individual identification is performed.

Note that although the eyeball imaging element 16 images the eyeball from the lower side and the sight is thus guided to the lower side of the screen in the present embodiment, it is only necessary to guide the sight to being directed in the imaging direction of the eyeball imaging element 16 in a case where the imaging direction of the eyeball imaging element 16 is another direction.

Note that although the releasing of lock at the time of activation of the camera has been exemplified in the present embodiment, the present embodiment is not limited thereto and can be applied to a case where predetermined restriction is applied to a function or the like of a smartphone, another mobile terminal, or the like and the restriction is released.

If the user presses the release button 5 to release lock in Step S002 in the state where the sight of the user has been guided to the downward direction of the screen in Step S001, the CPU 3 captures an eyeball image in a state where the eyeball is illuminated with infrared light from the light sources 13*a* to 13*d*.

At this time, the eyeball image of the observer illuminated with the infrared light is formed through the light receiving lens 15 on the eyeball imaging element 16, and the eyeball imaging element 16 performs photoelectric conversion to enable the eyeball image to be processed as an electrical signal.

In Step S003, the CPU 3 inputs the eyeball image signal obtained from the eyeball imaging element 16 as described above. In Step S004, the CPU 3 inputs the eyeball image information to the feature calculator 302 illustrated in FIG. 6.

Figure 6:
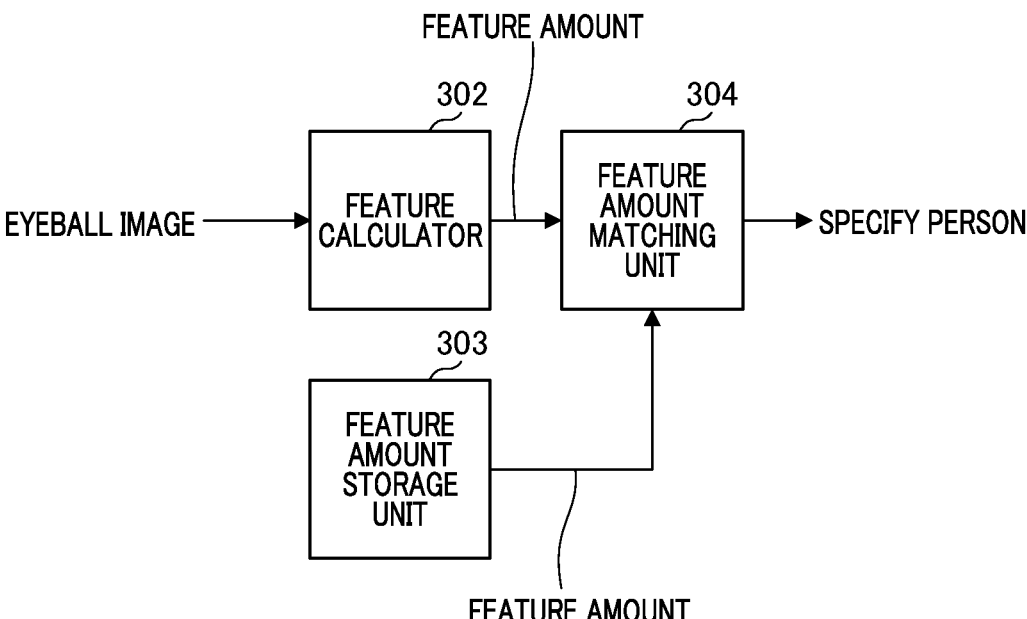
FIG. 6 is a functional block diagram illustrating a configuration example of an individual identification unit according to the embodiment.

FIG. 6 is a functional block diagram illustrating a configuration example of the individual identification unit according to the embodiment. Note that some of the functional blocks illustrated in FIG. 6 are realized by causing the CPU 3 serving as a computer included in the target identification device to execute the computer program stored in the memory unit 4 serving as a storage medium.

The feature calculator 302 illustrated in FIG. 6 calculates a feature amount indicating a feature of the individual on the basis of the input eyeball image. Details of the feature calculator 302 will be described later.

Note that the calculation of the feature amount performed by the feature calculator, which will be described later, has been exemplified as a method of calculating the feature amount by using the above feature calculator 302 in the present embodiment. However, the present embodiment is not limited thereto, and an iris code (iris data set) that is a known technology may be calculated and used.

In Step S005, the CPU 3 inputs the feature amount of the eyeball extracted in Step S004 to a feature amount matching unit 304 as illustrated in FIG. 6. Here, the feature amount storage unit 303 in FIG. 6 stores (registers) the feature amount of the eyeball of each of a plurality of persons who use the camera in advance and inputs the stored feature amounts of eyeballs of a plurality of persons to the feature amount matching unit 304.

The feature amount matching unit 304 in FIG. 6 successively matches the input feature amount of the eyeball of the person who is currently using the camera with the feature amounts of the eyeballs of the plurality of persons stored in advance. A person having the feature amount with the highest matching rate with the above result is determined from among the stored feature amounts of the plurality of eyeballs.

The person having the feature amount is specified as an individual identification result. As described above, Steps S002 to S005 function as an identification step (identification unit) of identifying the eyeball on the basis of the feature amount calculated from the eyeball image in the state where the sight direction is guided to the predetermined direction by the guide unit.

In this manner, it is possible to extract a feature amount that is easily identified by the target identification device and to perform individual identification in consideration of the result in the present embodiment. Note that a basic configuration example of the feature calculator 302 used in the aforementioned flow will be described by using FIGS. 7 and 8.

FIG. 7 is a diagram for explaining a configuration example of the feature calculator 302 that performs individual identification from two-dimensional image data according to the embodiment. Note that some of the functional blocks illustrated in FIG. 7 are realized by causing CPU 3 serving as a computer included in the target identification device to execute the computer program stored in the memory unit 4 serving as a storage medium.

The flow of the processing proceeds in the right direction with the left end indicating an input. In the feature calculator 302, a plurality of sets are aligned in order from 1 to L in a hierarchical manner with two layers called a feature detection layer (S layer) and a feature integration layer (C layer) forming one set. Also, it is assumed that a feature detection layer L+1 is provided in the final stage.

The feature calculator 302 detects the next feature on the basis of the feature detected in the previous stage layer in the S layer first. Also, the feature detected in the S layer is integrated in the C layer and is sent to the next hierarchy as a detection result in the hierarchy in the configuration.

Each S layer is configured of a plurality of feature detection cell planes and detects a different feature for each feature detection cell plane. Also, each C layer is configured of a plurality of feature integration cell planes and pools a detection result in the feature detection cell plane of the S layer in the previous stage.

Hereinafter, the feature detection cell plane and the feature integration cell plane will be collectively referred to as a feature plane in a case where it is not particularly necessary to distinguish them. In the present embodiment, the output layer that is a hierarchy in the final stage (the L+1-th hierarchy) is configured only of the S layer without using the C layer.

Figure 8:
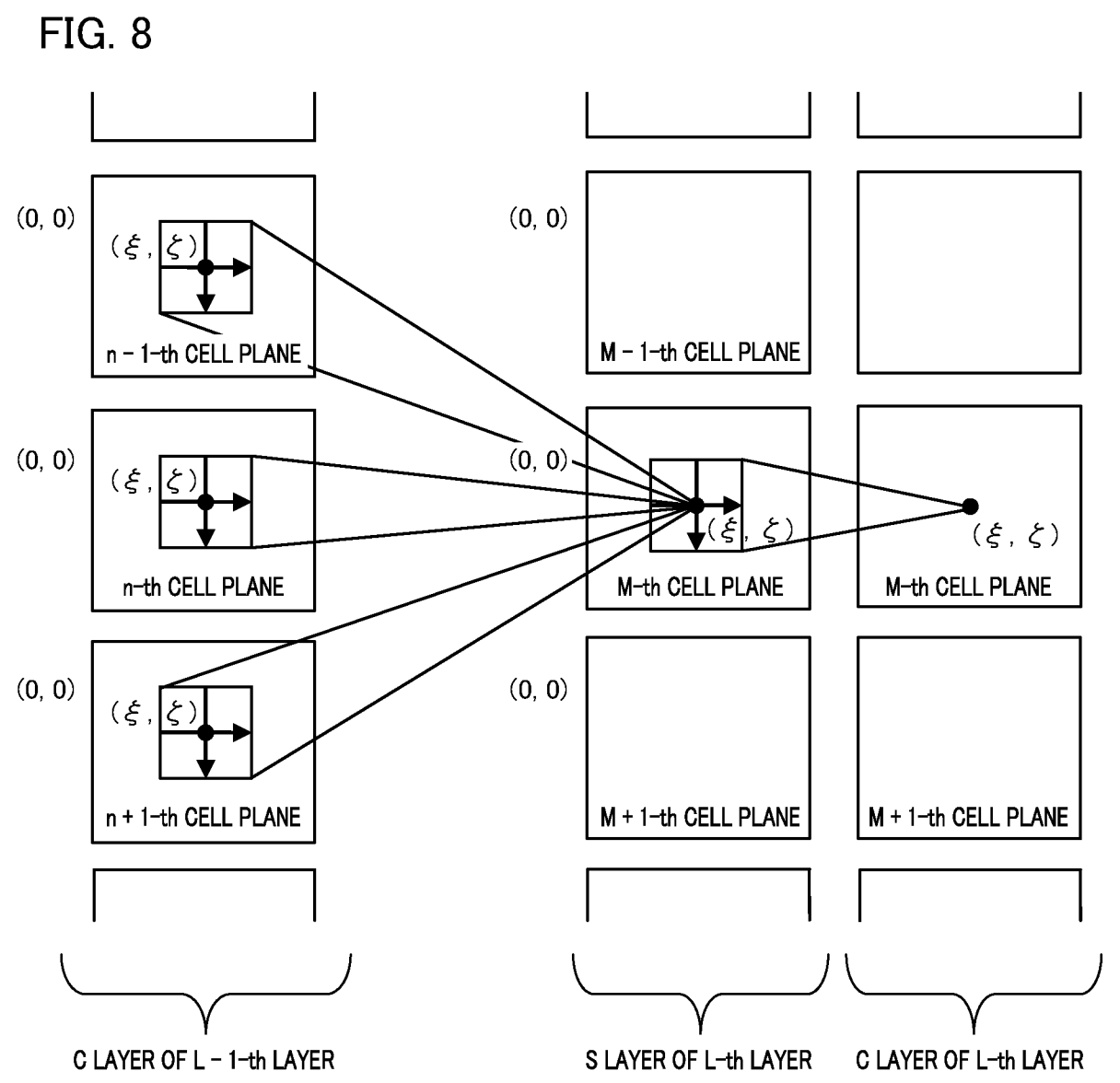

FIG. 8 is a diagram for explaining details of feature detection processing in the feature detection cell plane and feature integration processing in the feature integration cell plane. The feature detection cell plane of each S layer is configured of a feature detection neuron, and the feature integration cell plane of each C layer is configured of a feature integration neuron.

Each feature detection cell plane (feature detection neuron) of each S layer is linked to the feature integration cell plane (feature integration neuron) of the C layer in the previous stage with a predetermined structure. The feature integration cell plane (feature integration neuron) is linked to the feature detection cell plane (feature detection neuron) of the S layer in the same hierarchy with a predetermined structure.

The output value of the feature detection neuron at the position of Expression 1 below in the M-th cell plane of the S layer in the L-th hierarchy illustrated in FIG. 8 will be described as Expression 2, and the output value of the feature integration neuron at the position corresponding to Expression 1 in the M-th cell plane of the C layer in the L-th hierarchy will be described as Expression 3.

$$(\xi, \zeta) \qquad \text{(Expression 1)}$$

$$y_M^{LS}(\xi, \zeta) \qquad \text{(Expression 2)}$$

$$y_M^{LC}(\xi, \zeta) \qquad \text{(Expression 3)}$$

If the coupling coefficients of the neurons are represented as Expression 4 and Expression 5, respectively, $$w_M^{LS}(n, u, v) \qquad \text{(Expression 4)}$$

$$w_M^{LC}(u, v) \qquad \text{(Expression 5)}$$

The output values can be represented by Expression 6 and Expression 7 below, respectively.

$$y_M^{LS}(\xi, \zeta) \equiv f\left(u_M^{LS}(\xi, \zeta)\right) \equiv \qquad \text{(Expression 6)}$$
$$f\left\{\sum_{n,u,v} w_M^{LS}(n, u, v) \cdot y_n^{L-1,C}(\xi + u, \zeta + v)\right\}$$

$$y_M^{LC}(\xi, \zeta) \equiv u_M^{LC}(\xi, \zeta) \equiv \sum_{u,v} w_M^{LC}(u, v) \cdot y_M^{LS}(\xi + u, \zeta + v) \qquad \text{(Expression 7)}$$

Note that f in Expression 6 is an activation function, may be any function as long as it is a sigmoid function such as a logistic function or a hyperbolic tangent function, and may be realized by a tanh function, for example. Also, Expression 8 in Expression 6 is an internal state of the feature detection neuron at the pixel position of Number 1 in the M-th cell plane of the S layer in the L-th hierarchy.

$$u_M^{LS}(\xi, \zeta) \qquad \text{(Expression 8)}$$

Expression 7 uses a simple linear sum without using an activation function. In a case where the activation function is not used as in Expression 7, Expression 9 that is the internal state of the neuron is equal to Expression 10 that is an output value.

$$u_M^{LC}(\xi, \zeta) \qquad \text{(Expression 9)}$$

$$y_M^{LC}(\xi, \zeta) \qquad \text{(Expression 10)}$$

Also, Expression 11 below in Expression 6 will be referred to as a feature detection neuron, and Expression 12 below in Expression 7 will be referred to as a bonding target output value.

$$y_n^{L-1C}(\xi + u, \zeta + v) \qquad \text{(Expression 11)}$$

$$y_M^{LS}(\xi + u, \zeta + v) \qquad \text{(Expression 12)}$$

Next, parameters represented by Expression 13 below in Expression 6 and Expression 7 will be described.

$$\xi, \zeta, u, v, n \qquad \text{(Expression 13)}$$

The position represented by Expression 14 corresponds to the coordinates of the pixel position in the input image;

$$(\xi, \zeta) \qquad \text{(Expression 14)}$$

In a case where Expression 15 is a large output value, for example, it means that there is a high likelihood that the feature detected in the M-th cell plane of the S layer in the L-th hierarchy is present at the pixel position represented by Expression 14 in the input image.

$$y_M^{LS}(\xi, \zeta) \qquad \text{(Expression 15)}$$

Also, n means the n-th cell plane of the C layer in the L−1-th hierarchy in Expression 7 and is referred to as an integration target feature number. A product-sum operation for all the cell planes that are present in the C layer in the L−1-th hierarchy is basically performed. (u, v) are relative position coordinates of the coupling coefficient, and the product-sum operation is performed in the limited range (u, v) in accordance with the size of the detected feature.

Such a limited range of (u, v) is referred to as a receptive field. The size of the receptive field will be referred to as a receptive field size below and is represented by the number of horizontal pixels x the number of vertical pixels in the coupling range.

Also, Expression 16 is an input image like Expression 17 or an input position map like Expression 18 in L=1, that is, in the first S layer in Expression 6.

$$y_n^{L-1C}(\xi + u, \zeta + v) \qquad \text{(Expression 16)}$$

$$y^{in\_image}(\xi + u, \zeta + v) \qquad \text{(Expression 17)}$$

$$y^{in\_posi\_map}(\xi + u, \zeta + v) \qquad \text{(Expression 18)}$$

Furthermore, since neuron or pixel distribution is discrete, and the coupling target feature number is also discrete, the parameters in Expression 19 are not successive variables and are discrete values.

$$\xi, \zeta, u, v, n \qquad \text{(Expression 19)}$$

Here, the parameters represented by Expression 20 are non-negative integers, n is a natural number, and u and v are integers, both of which are within a limited range.

$$\xi, \zeta \qquad \text{(Expression 20)}$$

The part represented by Expression 21 in Expression 6 is coupling coefficient distribution for detecting a predetermined feature, and it is possible to detect the predetermined feature by adjusting this to an appropriate value.

$$w_M^{LS}(n, u, v) \qquad \text{(Expression 21)}$$

Adjustment of the coupling coefficient distribution is learning, and in construction of the feature calculator, the coupling coefficient is adjusted by presenting various test patterns and repeatedly and gradually correcting the coupling coefficient such that the value of Expression 22 becomes an appropriate output value.

$$y_M^{LS}(\xi, \zeta) \qquad \text{(Expression 22)}$$

Next, the part represented by Expression 23 in Expression 7 uses a two-dimensional Gaussian function and can be represented like Expression 24 below.

$$w_M^{LC}(u, v) \qquad \text{(Expression 23)}$$

$$w_M^{LC}(u, v) = \frac{1}{2\pi\sigma_{L,M}^2} \cdot \exp\left(-\frac{u^2 + v^2}{2\sigma_{L,M}^2}\right) \qquad \text{(Expression 24)}$$

Since (u, v) is a limited range in this case as well, the limited range will be referred to as a receptive field, and the size of the range will be referred to as a receptive field size similarly to the explanation of the feature detection neuron. The receptive field size may be set to an appropriate value in accordance with the size of the M-th feature of the S layer in the L-th hierarchy here.

In Expression 24, σ is a feature size factor which may be set to an appropriate constant in accordance with the receptive field size. Specifically, it is preferable that o be set such that the outermost value of the receptive field can be regarded as substantially zero.

It is possible to calculate the feature amount in the S layer in the final hierarchy by performing the arithmetic operation as described above in each hierarchy and to determine which user is using the camera.

According to the present embodiment, the indicator point 502 is caused to be displayed at a part on the side further downward than the screen center on the display element 10 as in FIG. 4 in Step S001 in FIG. 5 described above, and the display is provided to the user to encourage the user to release lock. The sight direction of the user is guided to the part on the side further downward than the screen center in the above configuration, and the reason will be described by using FIG. 9.

Figure 9:
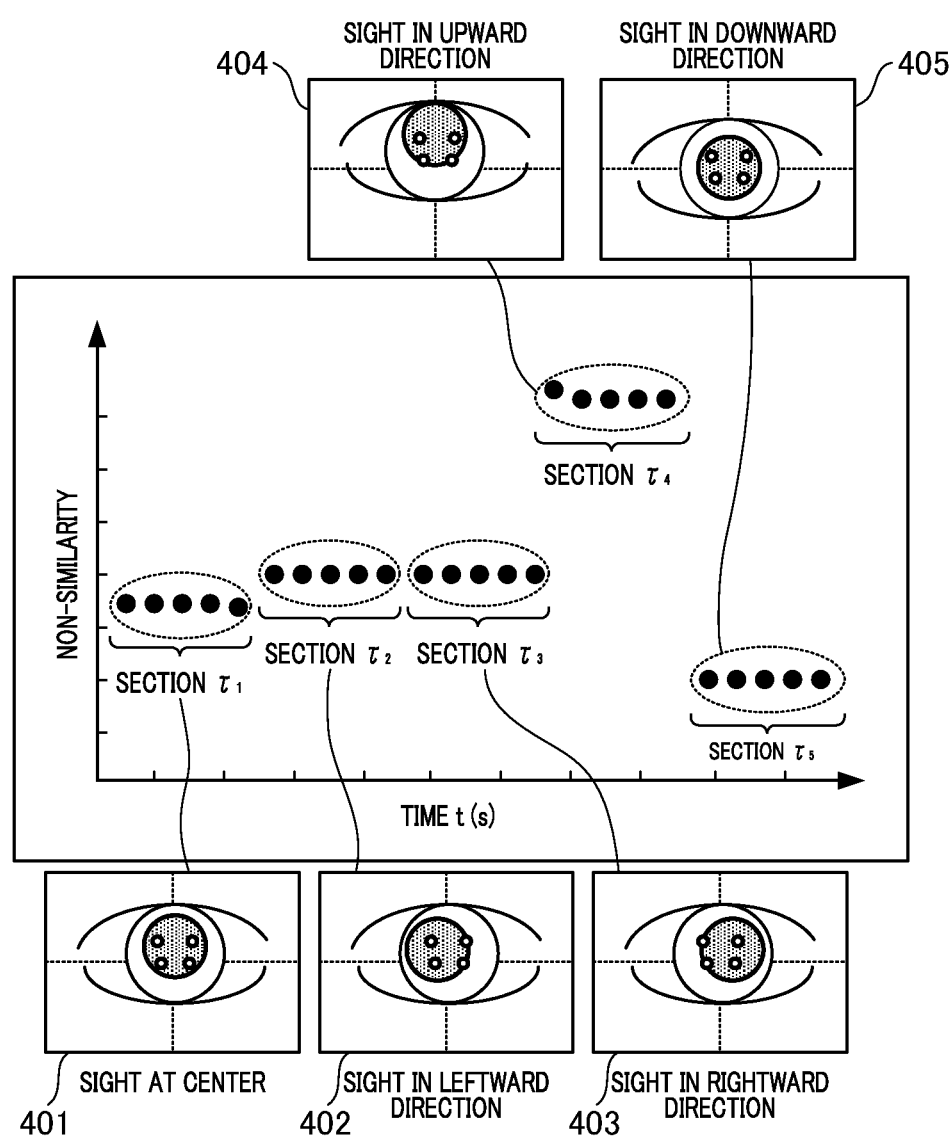
FIG. 9 is a diagram for explaining a change in evaluation value with respect to an eyeball direction.

FIG. 9 is a diagram for explaining a change in evaluation values in regard to the eyeball direction and illustrates non-similarity that is evaluation values in individual identification performed in a state where the user is viewing center, leftward, rightward, upward, and downward directions of the display element 10. The vertical axis in FIG. 9 represents the non-similarity that is the evaluation values in the individual identification, and smaller non-similarity that is closer to zero represents that the person is closer to the registered person. Conversely, larger non-similarity means a result that the person is more different from the registered person and is another person.

At this time, it is possible to ascertain that the non-similarity is large in the non-similarity result of the graph at the position corresponding to the illustrated eyeball image 404 as compared with the results at the positions corresponding to the other eyeball images 401 to 403 and 405. The state where the non-similarity is high is a state where the person is erroneously determined as another person regardless of the fact that the individual identification of the same person is performed as described above.

As described above, it is possible to ascertain that there is anisotropy in accuracy of individual identification with respect to the eyeball direction such that accuracy of the individual identification is degraded only in the eyeball image 404 corresponding to the state where the eyeball sees the upward direction as compared with the eyeball images in the states where the eyeball sees other directions, namely the center, leftward, rightward, and downward directions.

Figure 10A:
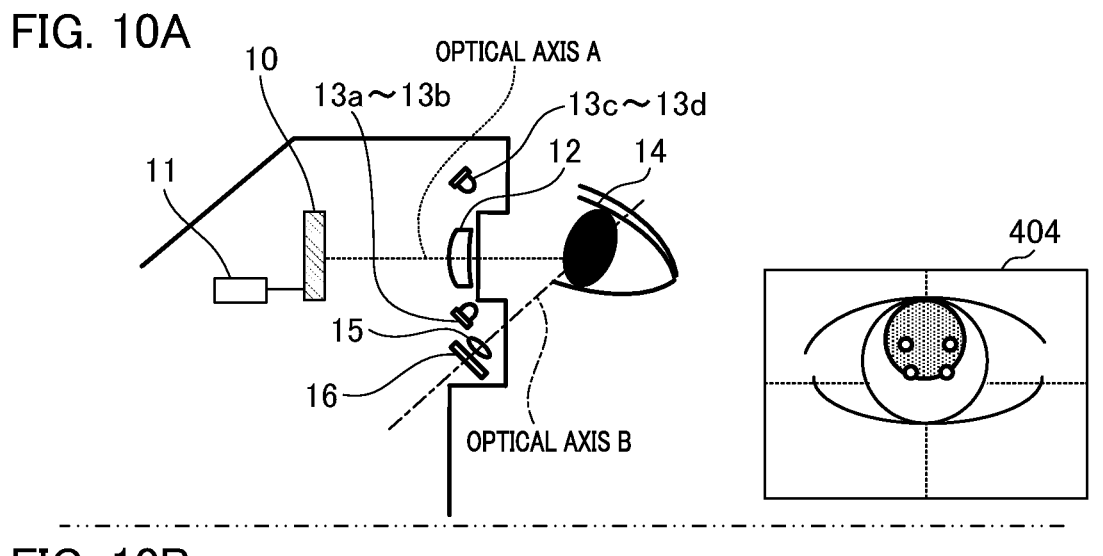
FIGS. 10A, 10B, and 10C are diagrams for explaining an eyeball appearing in an imaging element.
Figure 10B:
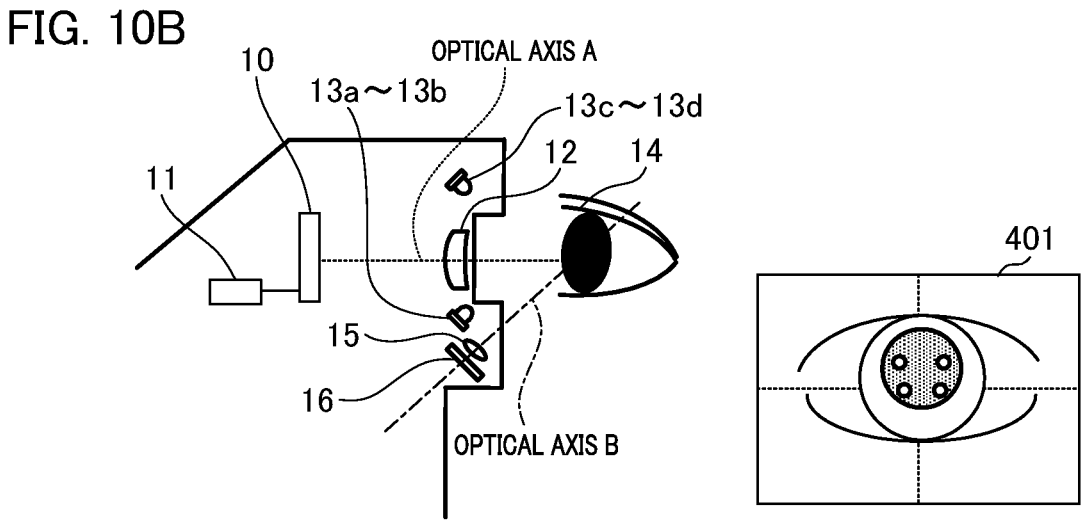
Figure 10C:
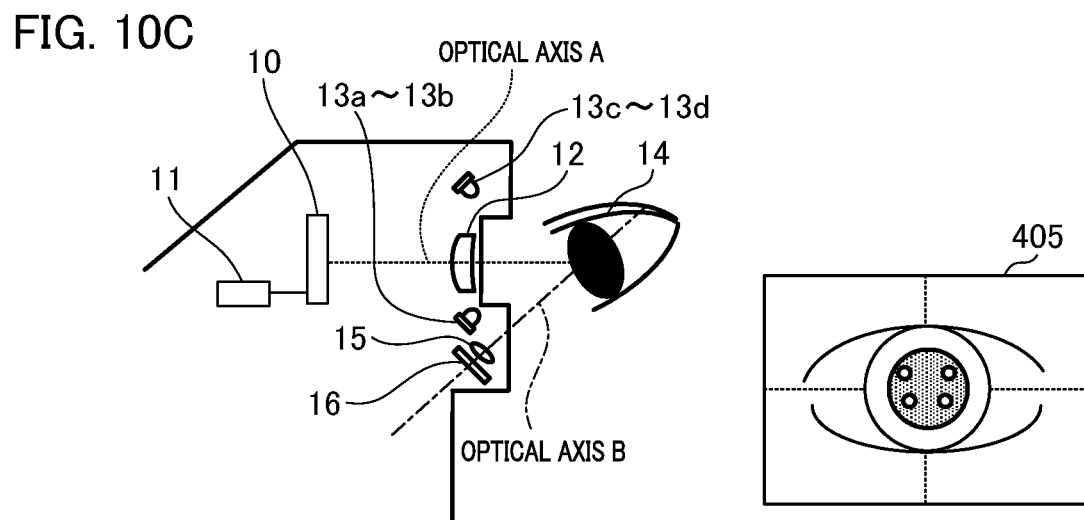

FIGS. 10A, 10B, and 10C are diagrams for explaining an eyeball appearing in the imaging element. The reason that the above phenomenon occurs is that the direction of the optical axis A of the display element 10 does not coincide with the direction of the optical axis B of the eyeball imaging element 16 and they have deviation in a specific direction as illustrated in FIG. 10.

When it is assumed that the optical axis of the display optical system including the display element 10 and the eyepiece lens 12 is the optical axis A and the optical axis of the eyeball imaging system including the eyeball imaging element 16 and the light receiving lens 15 is the optical axis B in FIGS. 10A to 10C, the optical axis B is disposed with deviation of a predetermined angle with respect to the optical axis A.

At this time, how the eyeball image appears significantly changes only when the eyeball gazing at the display element 10 deviates in a specific direction (the upward direction with respect to the camera as illustrated in FIG. 10A, for example) as illustrated in FIGS. 10A to 10C.

FIG. 10A is a diagram illustrating the state where the sight direction of the user is directed to the upward direction and corresponds to the eyeball image 404 (the sight in the upward direction) in FIG. 9. FIG. 10B is a diagram illustrating the state where the sight direction of the user is the optical axis A direction and corresponds to the eyeball image 401 (the sight at the center) in FIG. 9. FIG. 10C is a diagram illustrating the state where the sight direction of the user is directed to the downward direction and corresponds to the eyeball image 405 (the sight in the downward direction) in FIG. 9.

It is possible to ascertain that the change in how the eyeball image looks is significant in the image in FIG. 10A as compared with the images in FIGS. 10B and 10C. The eyeball imaging element 16 is disposed with deviation in the downward direction with respect to the eyeball looking into the display element 10, and therefore, the direction of the eyeball looking at the display element 10 is a direction with deviation from the aforementioned optical axis B of the eyeball imaging element 16.

At this time, it is possible to capture the eyeball image in a state where it is closer to the front image and to improve individual identification precision as the direction of the eyeball looking at the display element 10 is a direction closer to the optical axis B. Also, the eye is imaged from a further lateral direction as the direction of the eyeball is more separated from the direction of the optical axis B, and accuracy of individual identification is suddenly degraded with an increase in separation degree (angular difference) from the optical axis B.

Therefore, accuracy of eyeball identification is improved by guiding the sight of the user to the downward direction of the screen in the present embodiment. In other words, it is possible to guide the sight of the user to the direction close to the optical axis B of the eyeball imaging element 16 as in FIG. 10C and to improve accuracy of individual identification by displaying the indicator point 502 in FIG. 4 as described above on the lower side of the screen of the display element 10 or the like.

Note that it is possible for the user to direct the eyeball direction to a direction in which a high individual identification rate can be achieved and to enable eyeball recognition and individual recognition to be performed intuitively in a short period of time merely by operating an operation member such as a release button while looking at the displayed indicator according to the present embodiment.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the target identification device through a network or various storage media. Then, a computer (or a CPU, an MPU, or the like) of the target identification device may be configured to read and execute the program. In such a case, the program and the storage medium storing the program configure the present invention.

This application claims the benefit of Japanese Patent Application No. 2022-068161, filed on Apr. 18, 2022, which is hereby incorporated by reference herein in its entirety.

What is claimed is:

1. A camera comprising:
   a display element configured to display a lock screen of restricting utilization of the camera;
   an imaging element that has an optical axis direction with deviation from an optical axis direction of the display element and captures an image of an eyeball of a user; and
   at least one processor or circuit configured to
      control so that an indicator point is displayed at a predetermined position on the lock screen, the predetermined position being based on the optical axis direction of the imaging element, so as to guide a sight direction of the user toward the optical axis direction of the imaging element and to reduce a deviation between the optical axis direction of the imaging element and a direction of the eyeball viewing the display element,
      when an operation by the user for a predetermined operation member is performed after the indicator point is displayed in the lock screen, determine whether the user is a user of the camera registered in advance, based on a feature amount calculated from the image of the eyeball of the user captured by the imaging element; and
      when the user is determined to be the user of the camera registered in advance, enable utilization of the camera.

2. The camera according to claim 1, wherein the at least one processor or circuit is configured to
   in the lock screen, control so that display is performed urging the user to perform the operation for the predetermined operation member while viewing the indicator point.

3. The camera according to claim 2, wherein determining whether the user is a user of the camera registered in advance is performed when the user performs the operation for the predetermined operation member while viewing the indicator point.

4. The camera according to claim 1, wherein the operation for the predetermined operation is pressing a release button.

5. The camera according to claim 1, wherein the at least one processor or circuit is configured to
   after the indicator point is displayed in the lock screen, by an audio instruction, urge the user to view the optical axis direction of the imaging element.

6. The camera according to claim 1, wherein the at least one processor or circuit is configured to when the user is determined to be the user of the camera registered in advance, release a power-on locking of the camera.

7. The camera according to claim 1 further comprising a viewfinder, wherein the lock screen is a screen displayed immediately after the user looks into the viewfinder.

8. A target identification method using a display element configured to display a lock screen of restricting utilization of a camera and an imaging element that has an optical axis direction with deviation from an optical axis direction of the display element and captures an image of an eyeball of a user, the method comprising:

controlling so that an indicator point is displayed at a predetermined position on the lock screen, the predetermined position being based on the optical axis direction of the imaging element, so as to guide a sight direction of the user toward the optical axis direction of the imaging element and to reduce a deviation between the optical axis direction of the imaging element and a direction of the eyeball viewing the display element;

when an operation by the user for a predetermined operation member is performed after the indicator point is displayed in the lock screen, determining whether the user is a user of the camera registered in advance, based on a feature amount calculated from the image of the eyeball of the user captured by the imaging element; and when the user is determined to be the user of the camera registered in advance, enabling utilization of the camera.

9. A non-transitory computer-readable storage medium configured to store a computer program to control a camera having a display element configured to display a lock screen of restricting utilization of the camera and an imaging element that has an optical axis direction with deviation from an optical axis direction of the display element and captures an image of an eyeball of a user, the computer program comprising instructions for executing following processes of:

controlling so that an indicator point is displayed at a predetermined position on the lock screen, the predetermined position being based on the optical axis direction of the imaging element, so as to guide a sight direction of the user toward the optical axis direction of the imaging element and to reduce a deviation between the optical axis direction of the imaging element and a direction of the eyeball viewing the display element;

when an operation by the user for a predetermined operation member is performed after the indicator point is displayed in the lock screen, determining whether the user is a user of the camera registered in advance, based on a feature amount calculated from the image of the eyeball of the user captured by the imaging element; and when the user is determined to be the user of the camera registered in advance, enabling utilization of the camera.

* * * * *